United States Patent [19]

Stiennon

[11] Patent Number: 5,348,373
[45] Date of Patent: Sep. 20, 1994

[54] ELECROMECHANICAL RELEASE MECHANISM FOR A SEAT ASSEMBLY

[75] Inventor: Richard D. Stiennon, Southfield, Mich.

[73] Assignee: Hoover Universal, Inc., Plymouth, Mich.

[21] Appl. No.: 858,957

[22] Filed: Mar. 27, 1992

[51] Int. Cl.⁵ .............................................. B60N 2/02
[52] U.S. Cl. .......................... 297/344.1; 297/344.17; 248/424
[58] Field of Search ................ 297/340, 363, 364, 330, 297/344.17, 344.2, 344.23, 362.11, 366, 361.1, 344.1; 248/419, 424, 429

[56] References Cited

U.S. PATENT DOCUMENTS 2,974,998  3/1961  Hinka .............................. 297/344 X
4,508,386  4/1985  Hofmann ..................... 297/344.17 X

FOREIGN PATENT DOCUMENTS 3444483  6/1986  Fed. Rep. of Germany ...... 248/429
0253234  11/1986  Japan ................................. 248/424
0226449  9/1989  Japan ................................. 248/429

Primary Examiner—Laurie K. Cranmer
Attorney, Agent, or Firm—Harness, Dickey & Pierce

[57] ABSTRACT

An electromechanical release mechanism for a seat assembly is disclosed providing a release mechanism for a mechanical seat adjustment device in which the release mechanism is operated by an electrical switch that can be conveniently located within the motor vehicle in an easy to reach position for a seat occupant. The electromechanical release mechanism includes an electromechanical drive such as a solenoid or electric motor for moving a latch member to release a seat adjuster or seat recliner to enable adjustment of the seat assembly.

7 Claims, 4 Drawing Sheets

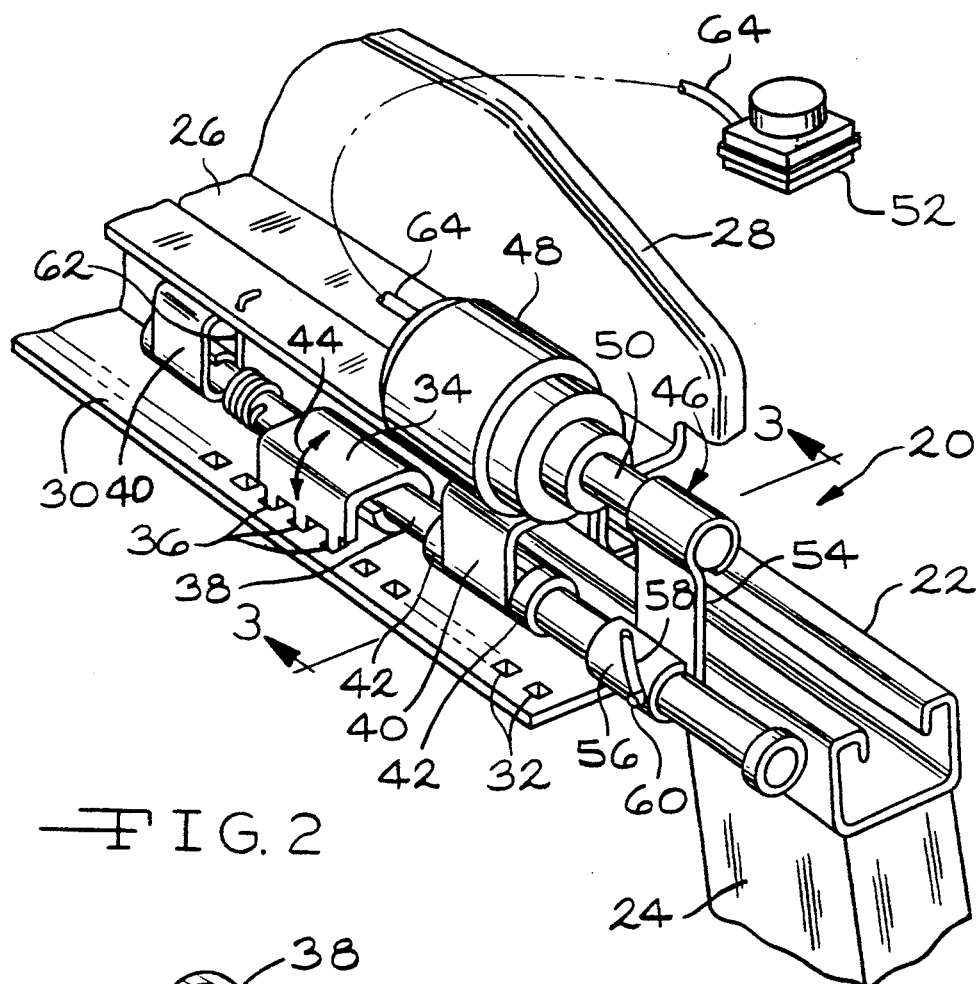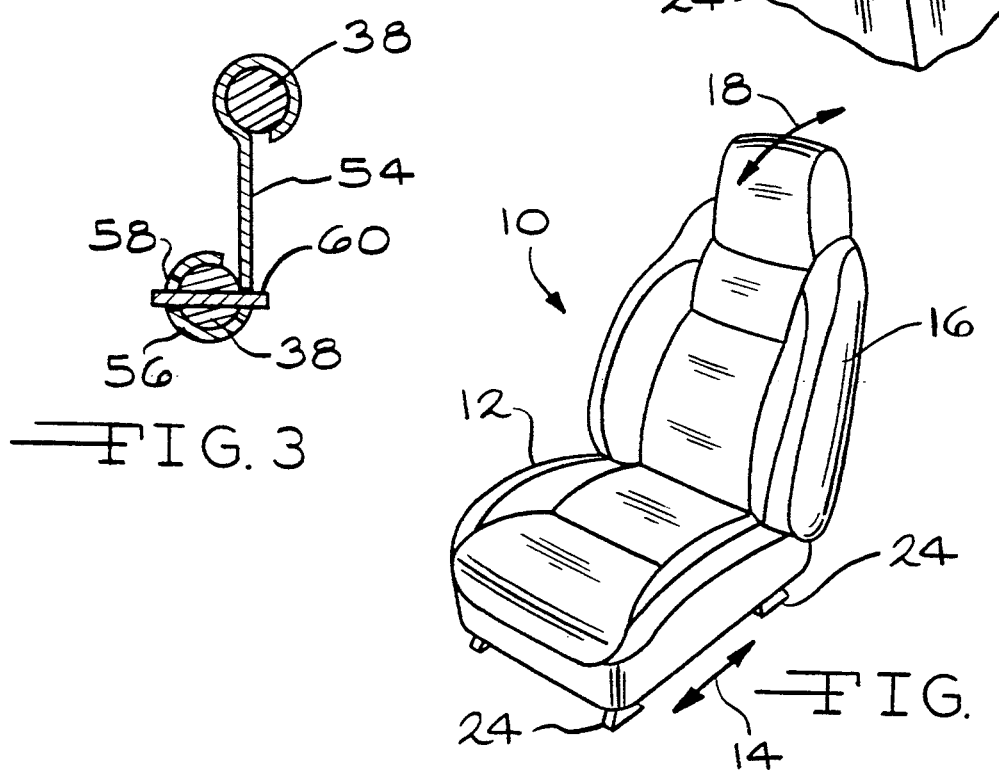

ELECROMECHANICAL RELEASE MECHANISM FOR A SEAT ASSEMBLY

BACKGROUND AND SUMMARY OF THE INVENTION

The present invention relates to a vehicle seat assembly and in particular to a vehicle seat assembly having a mechanical seat adjustment mechanism with an electromechanical release for operation of the adjustment mechanism.

Vehicle seat assemblies are typically provided with a fore and aft adjuster mechanism that enables the seat cushion and seat back of a seat assembly to be moved fore and aft within the motor vehicle. Such adjustment capability is necessary to enable vehicle operators of various sizes to be seated comfortably and safely within the motor vehicle. In addition, many seat assemblies are provided with a recliner mechanism to enable adjustment of the seat back angle relative to the seat cushion, this adjustment capability is also provided for the comfort and safety of the vehicle operator.

The seat adjuster and recliner mechanisms are either manually operated, having a mechanical mechanism for locking the seat in place and a mechanical release to free the adjuster and recliner mechanisms to enable adjustment, or the adjuster and recliner mechanisms are power operated, using a plurality of drive motors to move the seat assembly fore or aft and to rotate the seat back. Power seats, by virtue of the numerous additional components in the power adjustment mechanisms, are considerably more expensive than seats having manual seat adjustment mechanisms. Many persons are unable to buy power seats due to their added costs that, due to handicap or age, find it difficult to operate a manual seat adjustment mechanism. The fore and aft seat adjuster typically has a release lever located at the lower front of the seat assembly. The recliner mechanism typically has a release lever located along the side of the seat assembly at the base of the seat back. Both of these positions can be difficult for some persons to reach to operate the adjustment mechanisms.

Accordingly, it is an objective of the present invention to provide a seat assembly with low cost manual seat adjustment mechanisms with conveniently located and easily operated controls.

It is a feature of the present invention to provide an electromechanical release mechanism having an electrical switch conveniently located for the vehicle operator to release a mechanical seat adjustment mechanism and permit adjustment of a seat assembly. Once adjusted, release of the electrical switch results in re-engagement of the adjustment mechanism, locking the seat in position.

It is an advantage of the present invention that an electrical actuating switch can be conveniently located for the seat occupant while maintaining a low cost manual seat adjustment mechanism.

It is a further advantage of the present invention that a packaging of the seat adjustment mechanisms within the seat assembly can be simplified and provide greater design flexibility to the seat assembly engineer.

The electromechanical release mechanism of the present invention includes an electromechanical drive, such as a solenoid or an electric motor to release the mechanical seat adjustment mechanism. The electrical switch for operating the electromechanical drive can be conveniently located on an armrest, a console, steering wheel, etc. at the choice of the vehicle designer. Preferably, the switch will be located at an easily accessible position for the seat occupant.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a seat assembly having the electromechanical release mechanism of the present invention;

FIG. 2 is a fragmentary perspective view of the release mechanism of the present invention for a seat adjuster mechanism;

FIG. 3 is a sectional view as seen from substantially the line 3—3 of FIG. 2;

DETAILED DESCRIPTION OF THE INVENTION

Figure 4:
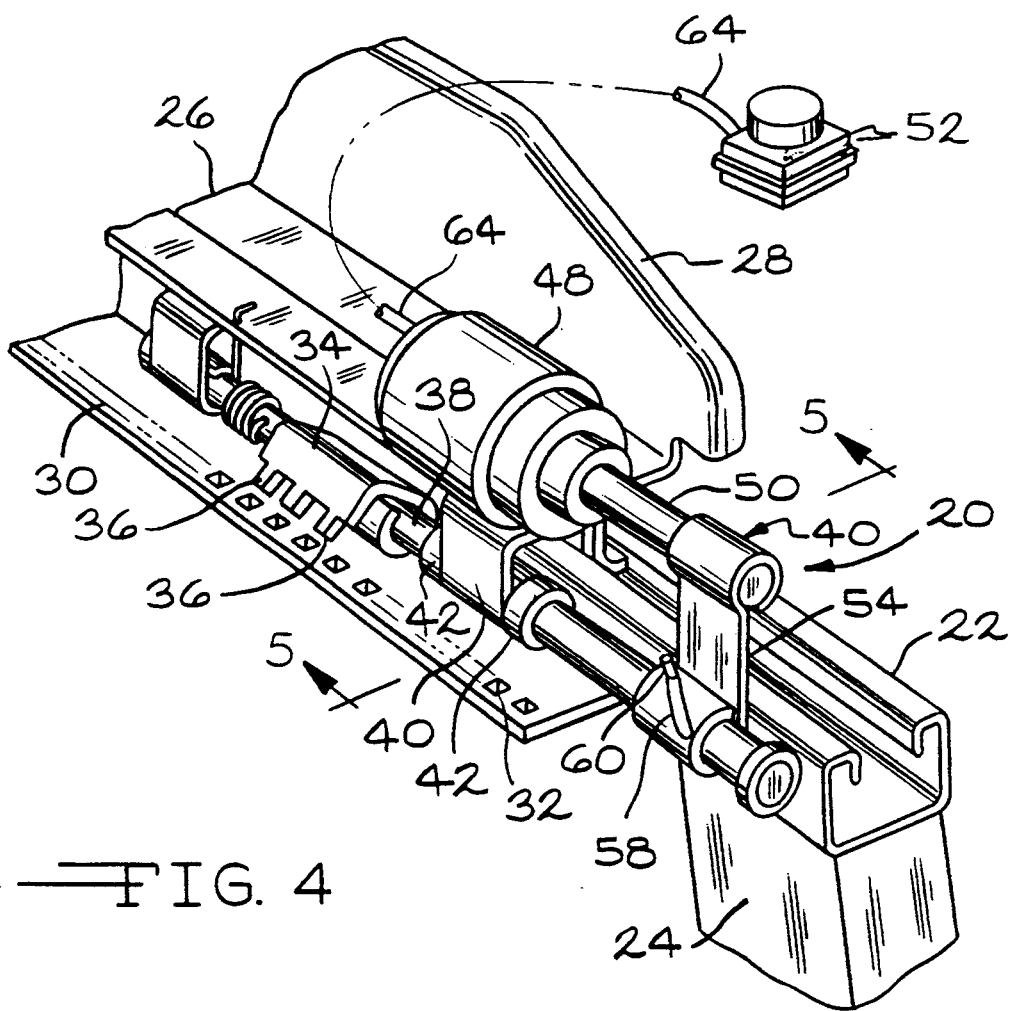
FIG. 4 is a perspective view similar to FIG. 2 showing the release mechanism in the release position of the adjuster.

The seat assembly 10 shown in FIG. 1 includes the electromechanical adjustment release mechanism of the present invention. The seat assembly 10 includes a lower seat cushion 12 and a seat back 16 extending upwardly from the rear of the seat cushion. The seat assembly is equipped with a fore and aft seat adjuster for moving the seat cushion and seat back fore and aft as shown by the arrow 14. The seat assembly 10 further includes a recliner for pivoting the seat back 16 about its lower end as shown by the arrow 18. The seat assembly is moved fore and aft for the purpose of adjusting the seat position for the comfort and safety of the operator while the seat back angle can be adjusted, also for the comfort and safety of the operator.

With reference to FIG. 2, the seat adjuster 20 is shown which provides for the fore and aft positioning of the seat cushion and seat back. The seat adjuster 20 includes a fixed rail 22 along each of the lateral sides of the seat assembly, only one of which is shown in FIG. 2. Fixed rail 22 is mounted to the floor pan of a motor vehicle through mounting feet 24. A slide rail 26 is carried by the fixed rail 22 for sliding movement fore and aft relative to the fixed rail in a well known manner for vehicle seat assemblies. A riser 28 extends upwardly from the slide rail to which the seat cushion 12 and seat back 16 are attached. By moving the slide rail 26 relative to the fixed rail 22, the seat cushion and seat back are moved within a vehicle.

Once the seat assembly has been adjusted fore and aft to a desired position, it is necessary for the seat assembly to be locked in place for the safety of the seat occupant. This is accomplished by providing a latch to lock the sliding and fixed rails together. A latch plate 30 is attached to the fixed rail 22 and has a plurality of apertures 32 aligned in a fore and aft extending linear array. A pawl 34 is rotatably carried by the slide rail 26 and contains a plurality of teeth 36 insertable into the apertures 32 in the latch plate 30. The pawl 34 is carried by a drive shaft 38 which is rotatably mounted to the slide rail 26 by a pair of bearing mounts 40. Collars 42 on both sides of the bearing mounts 40 prevent fore and aft sliding movement of the drive shaft 38 relative to the slide rail 26. The drive shaft 38 is rotatable, as shown by the arrow 44, to move the pawl from a latched position shown in FIG. 2 in which the teeth 36 are inserted into locking apertures 32 and a release position shown in FIG. 4 in which the teeth 36 are withdrawn from the locking apertures of the latch plate.

Typical mechanical seat adjusters are equipped with a handle or release lever attached to the shaft 38 that is manually lifted or turned etc. to rotate the shaft and move the pawl from the latch position to the release position. Such a release lever is often located beneath the front end of the seat cushion where it is difficult for elderly or handicapped people to reach.

The electromechanical release mechanism 46 of the present invention is provided to move the pawl from the locked position shown in FIG. 2 to the release position of FIG. 4 without the use of a manual release lever. The electromechanical release mechanism includes a solenoid 48 attached to the slide rail 26 having a plunger 50. When the solenoid 48 is energized by activation of electrical switch 52, the plunger 50 is extended forward from the solenoid 48. A coupling plate 54 is attached to the plunger 50 and includes a end portion 56 wrapped around the drive shaft 38. The end portion 56 is formed with a spiral cam slot 58 and a pin 60 that extends through the drive shaft 38 projects through the cam slot, forming a cam follower.

When the pawl 44 is in the latch position shown in FIG. 2, the pin 60 is at the forward end of the spiral cam slot 58. When the solenoid is energized, causing the plunger to extend forward, the coupling 54 will move forward. However, since the drive shaft 38 and pin 60 are prevented from moving forward by the collar 42, the pin 60 will follow the cam slot 58. This causes rotation of the drive shaft as the pin 60 travels to the rear end of the slot 58. The rotation of the drive shaft rotates the pawl 34 to the release position.

Figure 5:
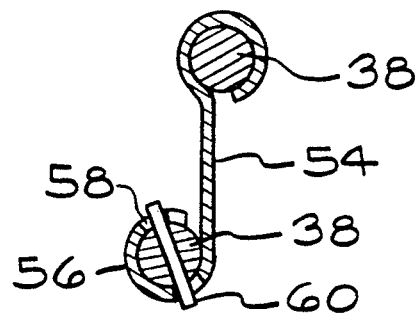
FIG. 5 is a sectional view as seen from substantially the line 5—5 of FIG. 4.

In the release position, the slide rail 26 is free to move fore and aft on the fixed rail 22 to adjust the position of the seat cushion and seat back within the motor vehicle. When the switch 52 is released, the solenoid is de-energized. Return spring 62 on the drive shaft and slide rail causes the drive shaft to return the pawl to the latch position. The switch 52 can be located anywhere within the motor vehicle that is conveniently reached by the seat occupant and is coupled to the solenoid by electrical wire 64. The sectional views in FIGS. 3 and 5 show the two positions of the pin 60 in the slot 58 corresponding to the latch and release positions of the pawl 34.

Figure 6:
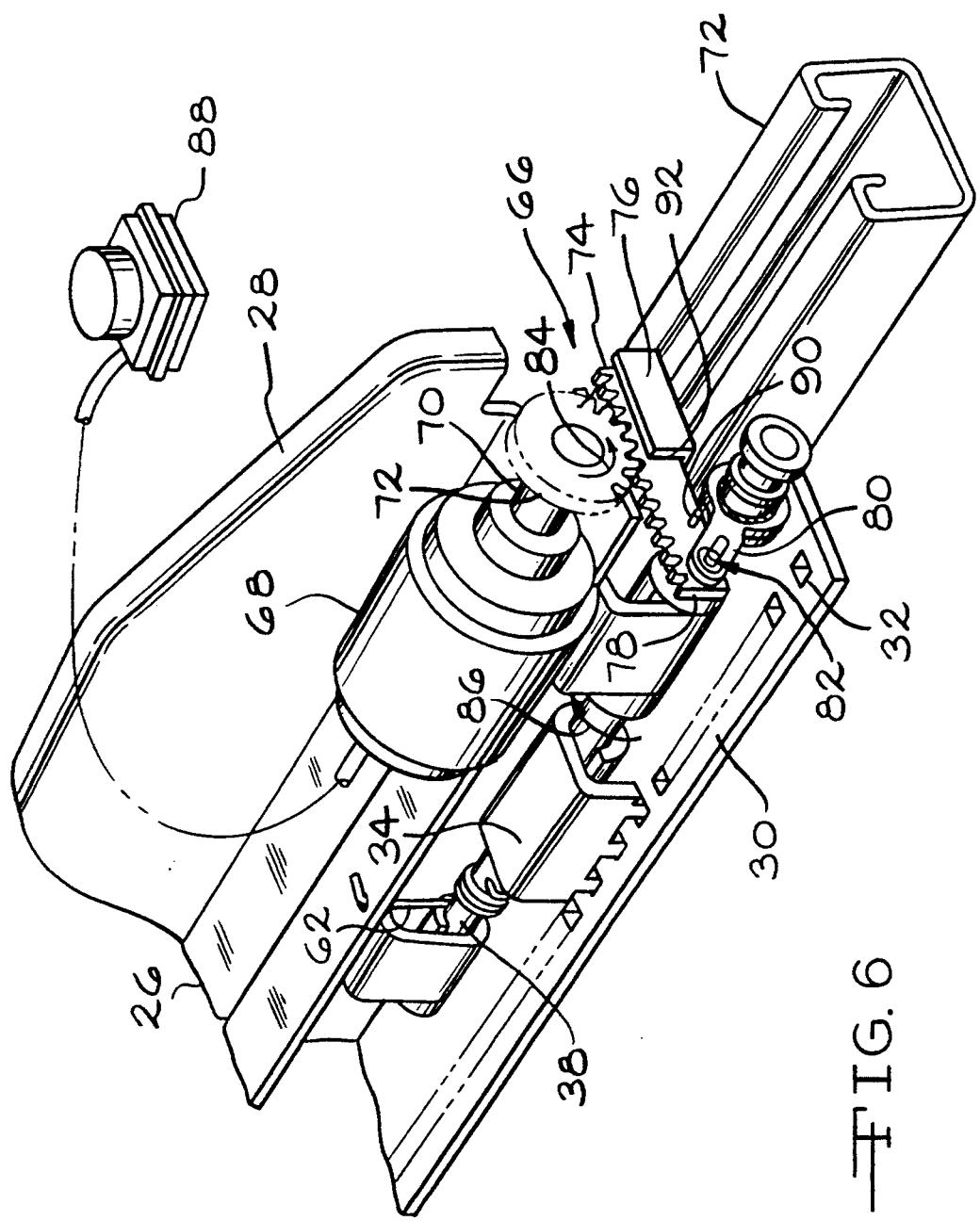
FIG. 6 is a perspective view of an alternative embodiment of the present invention utilizing a motor in the electromechanical release mechanism.

With reference to FIG. 6, an alternative embodiment of the electromechanical release mechanism of the invention is shown and designated generally at 66. In release mechanism 66, the solenoid has been replaced with an electrical motor 68 that rotationally drives the motor output shaft 70. A pinion gear 72 is driven by the output shaft 70 and meshes with a sliding rack 74. Rack 74 is contained within a channel 76 which guides the movement of the rack laterally relative to the seat assembly. The inboard end 78 of the rack is coupled to a lever 80 through a pin and slot coupling 82. The lever 80 is fixed to the drive shaft 38 whereby upon rotation of the pinion gear, the drive shaft 38 will rotate. Counterclockwise rotation of the pinion gear shown by arrow 84 moves the rack to the right, rotating the drive shaft in a clockwise direction shown by arrow 86 causing the pawl 34 to disengage from the latch plate apertures 32.

The motor 68 is energized by an electrical switch 88 that is mounted in a convenient location within the motor vehicle. The release mechanism is operated by closing the switch 88, energizing the motor 68 to rotate the pinion gear as described. The pinion gear will move the rack until stop 90 on the rack contacts the end 92 of the channel 76. Once this occurs, the rotation of the motor will be stopped. The motor 68 is constructed to enable the motor to remain energized and stationary for a short period of time after the stop 90 contacts the channel. The seat occupant, holds the switch 88 closed until the seat assembly has been moved to the desired position. Upon release of the switch 88, which is spring biased to the open position, the motor is de-energized and the return spring 68 rotates the drive shaft 38 to the latch position. The motor 68 can be of the same type as that used with power windows that are not damaged by the switch remaining open when the window has reached its limit of travel.

It is desirable for the release mechanism to be activated by a switch that is held in the closed position during the entire seat adjustment procedure. Once the switch is released, the release mechanism should allow the pawl to automatically return to the latch position. This avoids the possibility of the seat assembly remaining in the unlatched position unintentionally.

The two electromechanical release mechanisms 46 and 66 are coupled to the latch of the seat adjuster to enable the seat assembly to be moved fore and aft within the motor vehicle. The electromechanical release mechanism 94 shown in FIG. 7 operates the seat back recliner 96. The seat back recliner 96 includes a pair of mounting plates 98 and 100 attached to the riser 28. A seat back arm 102 is pivotally mounted to the plates 98 and 100 at pivot 104. A mechanical latch is provided to hold the sat back in place as follows. The seat back arm 102 forms a portion of the seat back frame and includes a sector gear 106 at its lower end with a plurality of gear teeth 108. The teeth 108 mesh with a pinion gear 110 rotatably mounted to plates 98 and 100 by shaft 112.

A locking wheel 114 is coupled to the shaft 112 and includes a plurality of locking teeth or serrations 116 over a majority of its periphery. A pawl 118 has a serrated locking portion 120 which engages with the teeth 116 of the locking wheel 114 to hold the locking wheel, shaft 112 and pinion gear 110 in place. The pawl 118 is rotatably mounted to the plates 98 and 100 by a pivot 122. The pawl 118 is held in place by a cam portion 124 of the release lever 126 which engages the side 128 of the pawl locking portion 120 opposite the serrations.

Figure 7:
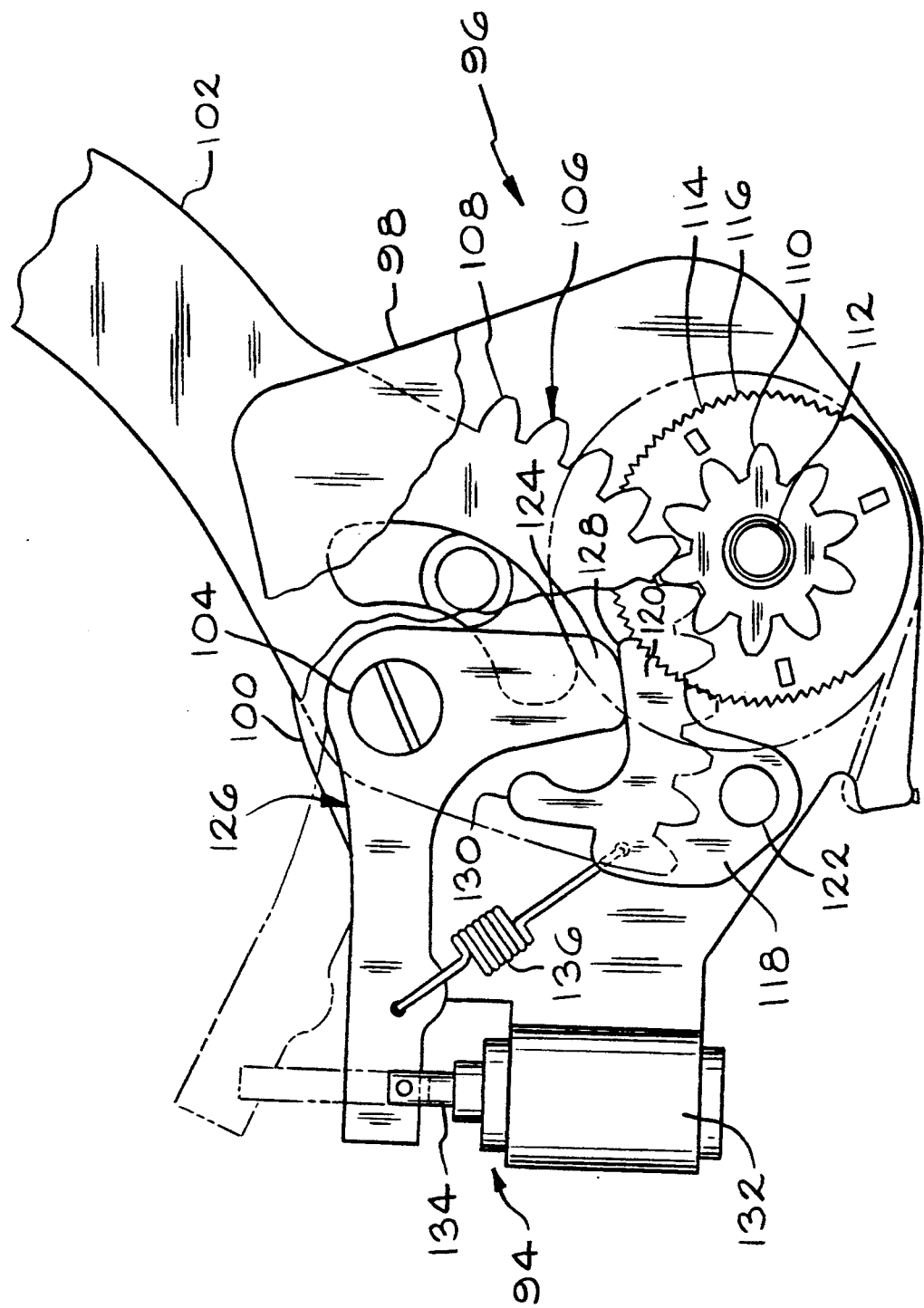
FIG. 7 is a seat back recliner with an electromechanical release mechanism according to the present invention.

The release lever 126 is rotatably carried by the pivot 104 and can be rotated from the solid line lock position shown in FIG. 7 to the broken line release position. Upon rotation to the release position, the cam portion 124 engages the release arm 130 of the pawl 118, causing the pawl to rotate out of engagement with the locking wheel 114. When this occurs, the shaft 114 and pinion gear 110 are free to rotate, allowing the seat back arm 102 to rotate the angle of inclination of the seat back to be adjusted.

A typically manual release for the recliner mechanism would include a handle portion on the release lever 126 for grasping by a seat occupant to manually operate the recliner. The handle is located at the base of the seat back and may be hard to reach for some individuals. The electromechanical release mechanism 94 of the present invention enables the recliner to be released by an electrical switch that is conveniently located. The release mechanism 94 includes a solenoid 132 mounted to plates 98 or 100 having a plunger 134 coupled to the release lever 126. Upon energization of the solenoid 132, the plunger 134 is extended from the solenoid 132 causing the release lever to rotate from the solid line latch position to the broken line release position, releasing the seat back arm 102. The electrical switch used to energize the solenoid 132 is conveniently located for a seat occupant. Upon release of the electrical switch de-energizing the solenoid, the return spring 136 coupled to the release lever and to the mounting plate 100 returns the pawl to the latch position.

The electromechanical release mechanism of the present invention operates to release a manual seat adjustment mechanism, such as the fore and aft seat adjuster or the seat back recliner while enabling the control for the release mechanism to be located within the motor vehicle at an easily reached position for a seat occupant. This is particularly advantageous for elderly and handicapped people who may have difficulty reaching the typical manual release levers for the seat adjustment mechanisms. The release mechanism of the present invention provides the convenience of power seat adjustment, i.e. easily accessible controls, at a small portion of the cost for a fully equipped power seat assembly.

It is to be understood that the invention is not limited to the exact construction illustrated and described above, but that various changes and modifications may be made without departing from the spirit and scope of the invention as defined in the following claims.

I claim:

1. In a seat assembly for a motor vehicle having a seat cushion, a seat back and a support for said seat cushion and seat back for mounting said seat assembly in a motor vehicle;
   means for moving one of said seat cushion or seat back relative to said support, said moving means including a fixed member mounted to said support and a moving member mounted to said one of said seat cushion or seat back for movement along with said one of said seat cushion or seat back;
   a pawl having teeth mounted to one of said fixed and moving members and a latch plate coupled to the other of said fixed and moving members and engagable with said pawl teeth for interlocking engagement to prevent movement of one of said seat cushion or seat back relative to said support, said pawl being selectively disengagable from said latch plate to permit movement of one of said seat cushion or seat back relative to said support; and
   electromechanical means for moving said pawl to disengage said pawl from said latch plate, said electromechanical means including a solenoid having a plunger movable linearly in one direction upon energization of said solenoid, switch means for energizing said solenoid when closed and means for coupling said plunger to said pawl for moving said pawl to disengage said pawl from said latch plate upon linear movement of said plunger in said one direction.

2. The seat assembly of claim 1 wherein said electromechanical release means includes an electromechanical drive for producing motion of a drive element upon electrical energization, switch means for electrically energizing said electromechanical drive when closed and means for coupling said drive element to said pawl whereby motion of said drive element moves said pawl to disengage said pawl from said latch plate.

3. The seat assembly of claim 2 wherein said electromechanical release means includes a return spring to return said pawl to engagement with said latch plate when said switch means is open.

4. The seat assembly of claim 1 wherein said moving means is a fore and aft seat adjuster for moving said seat cushion and seat back fore and aft within a motor vehicle.

5. A seat assembly for an automotive vehicle comprising:
   a fixed rail adapted to be mounted to an automotive vehicle;
   a slide rail movably mounted to said fixed rail for fore and aft movement of said slide rail relative to the vehicle;
   a latch mechanism for releasably locking said slide rail in place relative to said fixed rail, said latch mechanism including a pawl having a plurality of teeth rotatably mounted to one of said fixed and slide rails and a latch plate mounted to the other of said fixed and slide rails having complementary teeth for interlocking engagement with said pawl teeth to hold said slide rail in place relative to said fixed rail, said pawl being rotatable to disengage said pawl teeth from said latch plate teeth to permit movement of said slide rail relative to said fixed rail;
   electromechanical drive means coupled to said pawl for rotating said pawl to disengage said pawl from said latch plate, said electromechanical drive means including a linearly movable drive element coupled to said pawl for rotating said pawl upon linear movement of said drive element; and
   switch means for selectively operating said electromechanical drive means to rotate said pawl to disengage said pawl from said latch plate.

6. The seat assembly of claim 5 wherein said electromechanical drive means includes a solenoid and a linearly movable plunger movable in response to an electric current in said solenoid and means for coupling said plunger to said pawl to rotate said pawl in response movement of said plunger.

7. The seat assembly of claim 6 wherein said latch mechanism includes spring biasing means to move said pawl to engagement with said latch plate when said solenoid is not energized by electric current.

* * * * *